United States Patent
Mizoh

(12)
(10) Patent No.: US 6,477,002 B1
(45) Date of Patent: Nov. 5, 2002

(54) THIN FILM MAGNETIC HEAD FOR HIGH DENSITY RECORDING, A METHOD OF MANUFACTURING THE SAME, AND A MAGNETIC RECORDING APPARATUS COMPRISING THE SAME

(75) Inventor: Yoshiaki Mizoh, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 126 days.

(21) Appl. No.: 09/598,472

(22) Filed: Jun. 22, 2000

(30) Foreign Application Priority Data

Jun. 22, 1999 (JP) ............................................ 11-174994

(51) Int. Cl.⁷ ................................................. G11B 5/23
(52) U.S. Cl. ........................................................ 360/119
(58) Field of Search ................................. 360/119, 120, 360/121, 126, 317, 319

(56) References Cited

U.S. PATENT DOCUMENTS 5,621,595 A * 4/1997 Cohen ......................... 360/119
5,959,813 A * 9/1999 Watanabe et al. ............ 360/126
6,178,065 B1 * 1/2001 Terunuma et al. ........... 360/119

FOREIGN PATENT DOCUMENTS

JP 2-272731 11/1990

* cited by examiner

Primary Examiner—David Davis
Assistant Examiner—Jennifer M Dolan
(74) Attorney, Agent, or Firm—McDermott, Will & Emery

(57) ABSTRACT

The constitution includes a common shield having both shield function and lower magnetic core function, a recording gap formed on the common shield, having specified gap length and gap depth, an upper magnetic core disposed oppositely to the common shield through the recording gap, and a pair of shunt members made of a soft magnetic material formed at the side of the recording gap, being magnetically insulated from the common shield and upper magnetic core through a nonmagnetic layer. It hence presents a thin film magnetic head and its manufacturing method capable of suppressing the leak magnetic field generated in the recording gap, decreasing the recording fringe substantially, narrowing the track of the recording head, and enhancing the recording track density.

21 Claims, 18 Drawing Sheets

(a)

(b)

(a)  80

(b)  81

(c)  82
81

(d)  83
82

(e)  84
82

(f)  85
84
81

(g)  86
85

(h)  87
86

(i)  802 801
85 803

(j)  88

(k)  802 801
89 803 89
85

(l)  800

PRIOR ART

THIN FILM MAGNETIC HEAD FOR HIGH DENSITY RECORDING, A METHOD OF MANUFACTURING THE SAME, AND A MAGNETIC RECORDING APPARATUS COMPRISING THE SAME

BACKGROUND OF THE INVENTION

1. Field of the Invention

The present invention relates to a thin film magnetic head used in a magnetic recording and reproducing apparatus such as a hard disk device and a magnetic tape device and having effects in high density recording, its manufacturing method, and a magnetic recording and reproducing apparatus mounting such thin film magnetic head.

2. Description of the Related Art

Hitherto, in a magnetic recording and reproducing apparatus, using an inductive type recording head, signals are recorded in a magnetic recording medium such as magnetic tape or magnetic disk, and the signals recorded in the magnetic recording medium are detected by using a magneto-resistive type (MR type) reproducing head.

In a magnetic recording and reproducing apparatus where high-density recording is required, the recording head and reproducing head are separately composed in order to optimize the recording efficiency and reproducing capacity. For example, in a hard disk device, a so-called thin film magnetic head integrally forming the inductive type recording head and MR type reproducing head or GMR type reproducing head as shown in FIG. 15 and FIG. 16 is used.

A conventional thin film magnetic head is explained by referring to the drawings.

FIG. 15 is a front schematic view showing an air bearing surface (ABS) of a conventional thin film magnetic head with a recording medium, and FIG. 16 is a top view of the conventional thin film magnetic head.

As shown in FIG. 15, a recording head 150 of this thin film magnetic head is composed of an upper magnetic core 151, a recording gap 152, a lower magnetic core 153 disposed adjacent the recording gap 152, and a coil winding 164 (see FIG. 16). The lower magnetic core 153 is also called a common shield because it has also a shielding function for the reproducing head. Herein, the width 154 of the portion confronting the common shield of the upper magnetic core 151 defines the mechanical recording track width.

A reproducing head 159 is composed of the common shield 153 and a lower magnetic shield 157 which are disposed adjacent a reproducing gap 158, and an MR element 156 disposed between the shields 153 and 157.

FIG. 17 shows a state of the recording magnetic field generated around the recording gap 152, and a recording track width 171 is formed by the recording magnetic field. Due to the recording magnetic field leaking at both ends of the recording gap 152, a recording region 171 where information is recorded on a magnetic recording medium spreads wider than the mechanical track width 172 of the magnetic core 151. The region 173 in the recording magnetic field spreading wider than the mechanical track width is called a recording fringe. As mentioned above, the recording track width 171 is composed of the recording fringes 173 formed at both sides of the recording gap 152, and a normal recording region 172. On the other hand, the reproducing track width 155 (see FIG. 15) is generally formed smaller than the recording track width 171 in order to maintain an off-track margin.

The magnetic field strength of recording fringe 173 is weaker than that of the normal recording region 172, and is different in the demagnetization field components in the recording medium as compared with the normal recording region 172, and therefore the recording phases are different, and the noise components are larger.

An example of calculation of recording magnetic field occurring around the recording gap 152 in the composition in FIG. 17 is shown in FIG. 18. Herein, the x-direction is the gap width direction, the y-direction is the gap length direction, and the z-direction shows the intensity of the recording magnetic field. The swell of the recording magnetic field due to recording fringe is shown in parts 181 and 182 in the diagram.

In a conventional magnetic head, it has been attempted to join the butt ends of the recording gap in order to reduce the recording fringe in the width direction of the recording gap. For example, in a head for VTR, in order to eliminate butt end deviation, a trimming method wherein magnetic cores of the vicinity of the gap 191 are trimmed in shape 192 has been proposed as shown in FIG. 19 (for example, Micro-Machining of Magnetic Metal Film Using Electro-discharge Technique. Y. Honma, International Conference of Micromechanics for Information, PP.318, 1997).

In the thin film magnetic head for HDD, a shape is proposed as shown in FIG. 20, in which a protrusion 203 is formed on a common shield 202 having a greater width than an upper magnetic core 201 by trimming. (For example, see Kiyono, "Effects of writing magnetic pole trimming in merge type MR head," Lectures at 22nd Meeting of Japan Society of Applied Magnetism, p. 202, 1998.)

Generally, penetration distance of the magnetic field leaking from the recording gap is equal to or less than the ½ height of the gap width. Therefore, if attempted to reduce the fringe by a technique of joining the butt ends of the recording gap, the recording fringe in the recording magnetic field shown in FIG. 17 expanded by the portion of gap width at maximum. Therefore, in order to record at higher density, it was required to reduce the recording track width further and curtail the recording fringe amount substantially at the same time.

SUMMARY OF THE INVENTION

The invention therefore provides a thin film magnetic head constituted by integrally forming an inductive recording head composed of a common shield serving commonly as upper magnetic core and lower magnetic core disposed adjacent a recording gap, and a coil winding, and a reproducing head composed of MR elements disposed between the common shield and lower magnetic shield, and the both magnetic shields, in which a shunt member made of a soft magnetic material is provided near the recording gap of the recording head.

This configuration presents a thin film magnetic head capable of suppressing leak magnetic field generated at the recording gap, decreasing the recording fringe substantially, narrowing the track in the recording head, and enhancing the recording track density, and a method of manufacturing the same.

DETAILED DESCRIPTION OF THE PREFERRED EMBODIMENTS

Figure 1:
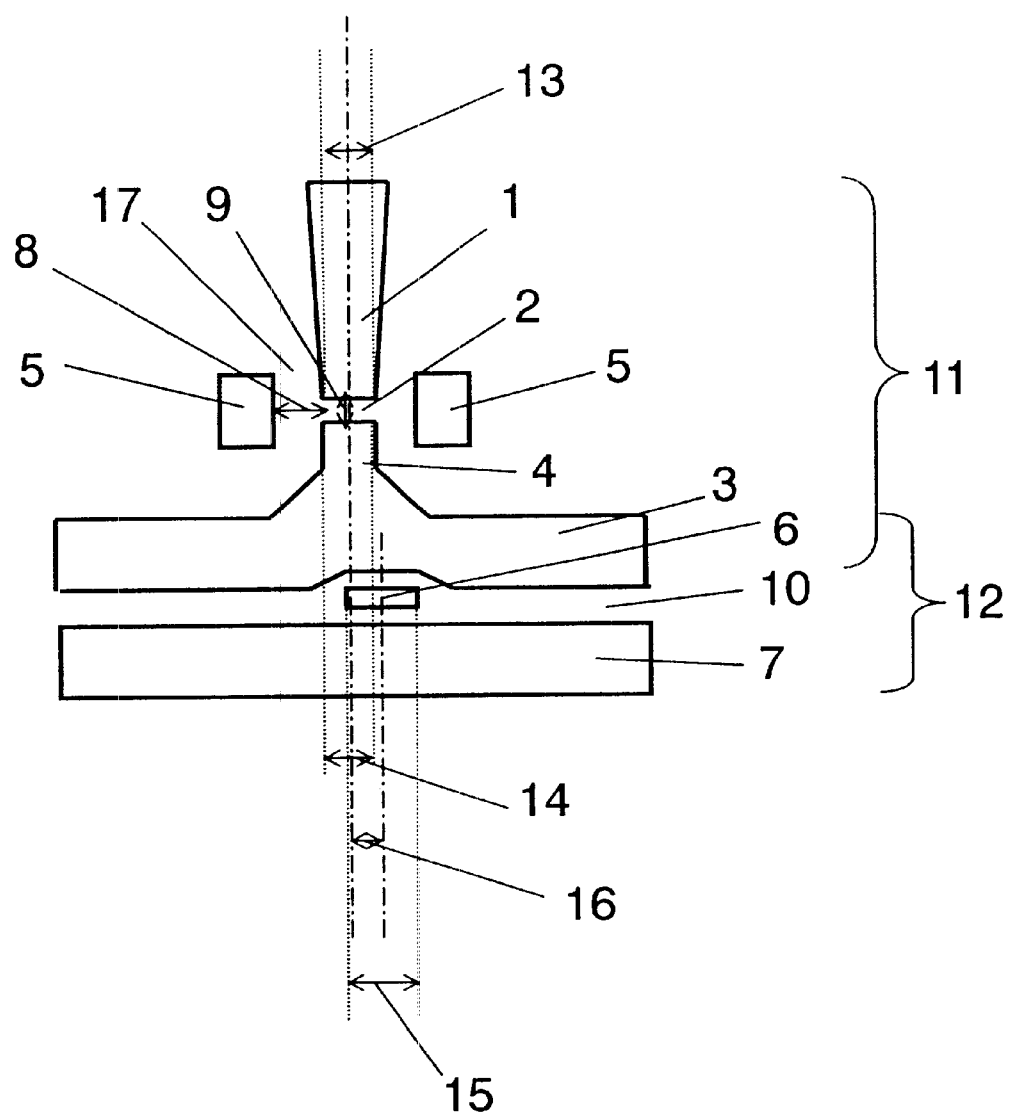
FIG. 1 is a front schematic view of a thin film magnetic head showing embodiment 1 of the invention.

Referring now to the drawings, preferred embodiments of the invention are described in detail below.

(Embodiment 1)

FIG. 1 is a front schematic view showing a thin film magnetic head of the invention seen from an air bearing surface (ABS) side.

An upper magnetic core 1 and a common shield 3 having a protrusion 4, both made of a soft magnetic material, are disposed adjacent a recording gap 2 made of a nonmagnetic material. A mechanical recording track is composed of the upper magnetic core 1 and the protrusion 4. Behind the recording gap 2, there is a coil winding (not shown). At a position at distance 8 from both ends of the recording gap 2, a pair of shunts 5 composed of a soft magnetic material are disposed, and the periphery is filled with an insulating material 17.

The upper magnetic core 1, recording gap 2, common shield 3, coil winding, and pair of shunts 5 are put together to compose a recording head 11. The length 9 of the recording gap 2 is also called the gap length.

A reproducing head 12 is composed of the common shield 3, lower shield 7, and MR element 6 disposed between the shields 3 and 7. Further, MR element 6 is insulated from the shields 3 and 7 by a reproducing gap 10.

The mechanical recording track width is defined by the length of the overlapping portion of the width 13 of the upper magnetic core 1 and the width 14 of the protrusion 4. Generally, the butt deviation of the upper magnetic core width 13 and protrusion width 14 is minimized. An offset 16 of the center of the reproducing track width 15 and the center of the recording track is provided depending on the performance of the magnetic recording apparatus to be mounted.

The mechanical recording width is measured by an optical microscope or SEM. The magnetic recording track width is measured by using the half-width of the off-track characteristic or by developing the bit pattern.

The magnetic field distribution generated from the recording gap 2 is determined by using the well-known Karl-Quivist formula (1), or finite element method or finite volume method.

$$H(x,y)=(Hg/2\pi)\times[\arctan[[g/(2+x)]/y]+\arctan[[g/(2-x)]/y]] \quad (1)$$

When a magnetic field greater than the coercive force Hc of the magnetic recording medium is applied to the magnetic recording medium, the magnetic recording medium is magnetized in the direction of magnetic field. Generally, penetration distance of the magnetic field leaking from the recording gap is equal to or less than ½ height of the gap width. The fringe amount in the track width direction is estimated to be a similar quantity. Therefore, recording fringe of about ½ of gap width occurs usually. Further, when the tip of the magnetic core is saturated, the fringe amount is increased.

Figure 2:
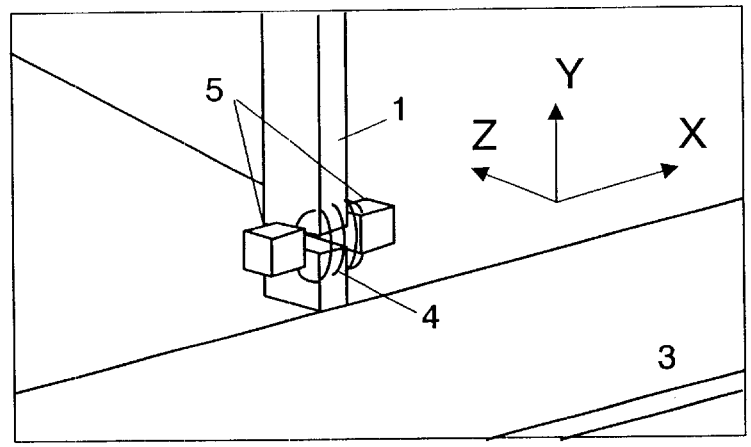
FIG. 2 is a diagram showing flow of magnetic flux and a calculation example of magnetic field intensity of the thin film magnetic head in embodiment 1 of the invention.
Figure 2:
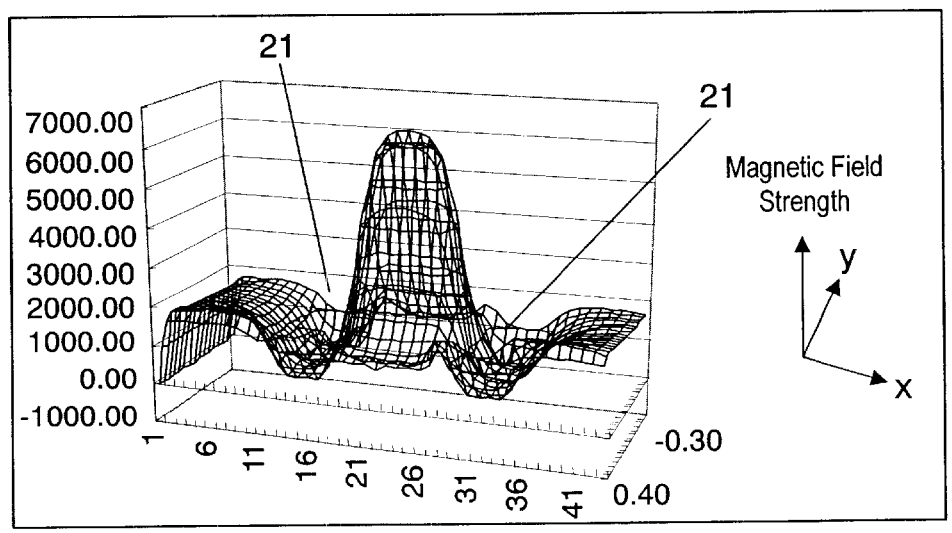

FIG. 2(a) shows the recording magnetic field when the shunt members 5 are provided near the recording gap in the invention.

By forming the shunts 5, the leak magnetic flux in the x- and y-direction at both ends of the recording gap 2 flows more in the direction of the shunts 5 than in the direction of the magnetic recording medium. As a result, the recording fringe amount and recording fringe width recorded in the magnetic recording medium are decreased.

Figure 18:
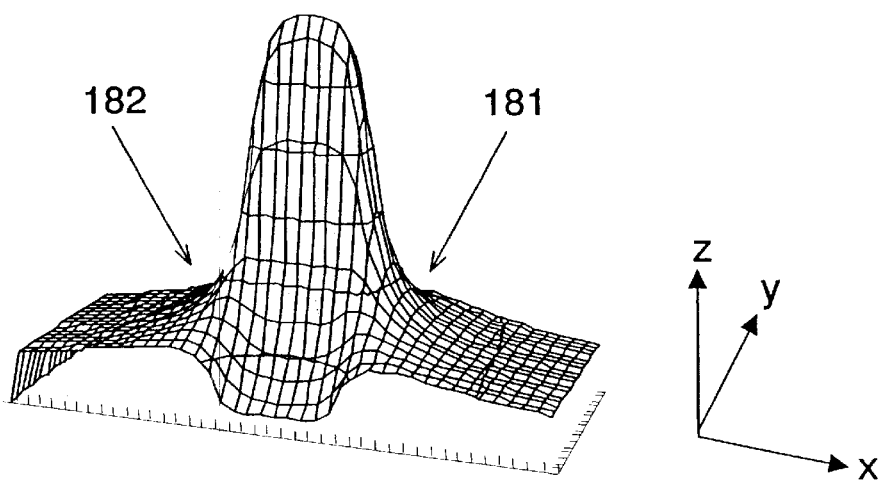
FIG. 18 is a schematic graph showing an example of magnetic field calculation of the conventional thin film magnetic head.
Figure 19:
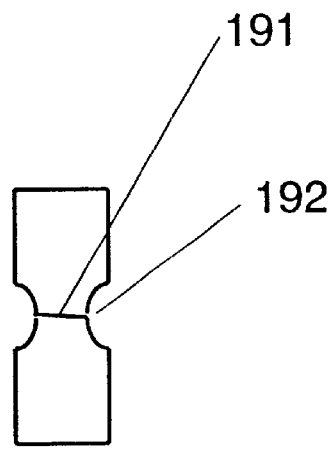
FIG. 19 is a front schematic view showing an example of improvement of the conventional magnetic head.
Figure 20:
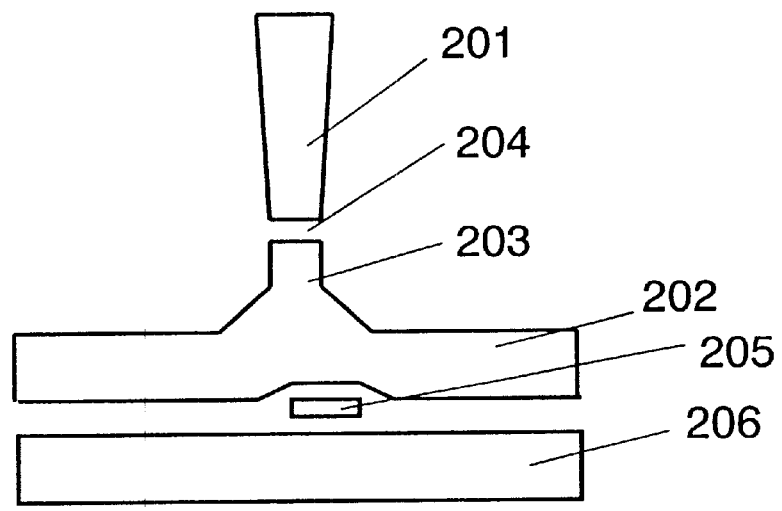
FIG. 20 is a front schematic view showing an example of improvement of the conventional thin film magnetic head.

FIG. 2(b) shows a magnetic field distribution near the recording gap calculated by the finite volume method. As compared with the swells 181 and 182 in FIG. 18 showing a calculation example in a prior art, it is known that the recording fringe 21 in the track width direction is substantially decreased.

As for the magnetic characteristic of the shunts 5, the saturated magnetic flux density should be 0.5 T or more, and preferably 0.8 T or more. The magnetic permeability of the shunts 5 should be 100 or more, preferably 1000 or more. If the saturated magnetic flux density is less than 0.05 T, the recording fringe increases. This is because the magnetic flux flowing in the shunts 5 decreases, and the leak magnetic field increases. However, the magnetic permeability of the shunts 5 is preferred to be same as or lower than the magnetic permeability of the soft magnetic material for composing the upper magnetic core 1 and protrusion 4 of the common shield 3. If the magnetic permeability of the shunts 5 is higher than the magnetic permeability of the soft magnetic material for composing the upper magnetic core 1 and protrusion 4 of the common shield 3, too much leak magnetic flux flows into the shunts 5, and the magnetic flux reaching the recording medium through the recording gap 2 decreases, thereby leading to inconveniences such as worsening of overwriting characteristic and increase of optimum recording current.

Figure 3:
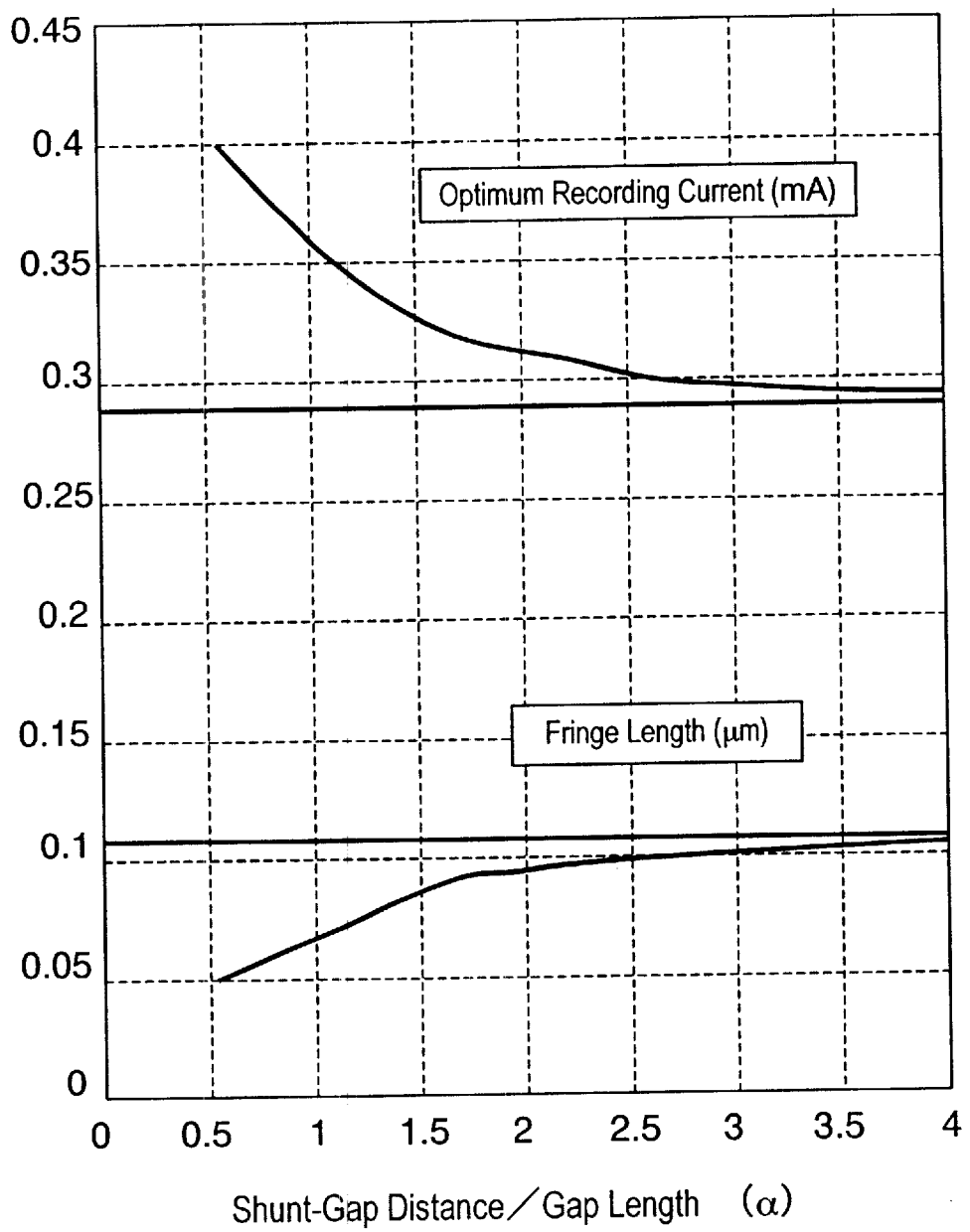
FIG. 3 is a graph showing optimum recording current and fringe amount in embodiment 1 of the invention.

When the shunts 5 are provided closely to the recording gap 2, the magnetic flux flowing into the shunts 5 increases, and the recording magnetic field decreases. The present inventor accumulated intensive studies and obtained the results as shown in FIG. 3, which shows the relation between the recording fringe amount and optimum recording current by varying the ratio α of the recording gap length 9 and the distance 8 from the shunts 5 to the side end of the recording gap 2 (α=distance 8 of shunt and recording gap/recording gap length 9). In FIG. 3, when α is smaller than 1.5, it is known that the optimum recording current increases. When a is more than 3, the decreasing effect of recording fringe is only 5% or less. Herein, the optimum recording current is determined at the point where the recording magnetic field becomes more than 6000 Oe. From FIG. 3, setting the value of a as follows, $$1.5 < \alpha < 3 \quad (2)$$

it is known that the recording fringe can be suppressed without increasing the optimum recording current.

Thus, according to the embodiment, the following effects are obtained.

(1) At the recording time, the leak magnetic flux occurring near both ends of the recording gap in the gap width direction flows into the shunts, and the recording fringe recorded in the magnetic recording medium can be suppressed small in both fringe amount and fringelength. As a result, by narrowing the recording track pitch recorded in the magnetic recording medium, the recording density can be enhanced.

(2) By setting the magnetic permeability of the shunts lower than the magnetic permeability of the soft magnetic material for forming the upper magnetic core and protrusion of the common shield, excessive flow of the leak magnetic flux into the shunts can be suppressed. As a result, favorable overwriting characteristic and optimum recording current are maintained.

(3) By setting the ratio α of the recording gap length and the distance from the shunt to the side end of the recording gap in the range expressed in formula 2, the recording fringe can be suppressed, and the optimum recording current is not increased.

(Embodiment 2)

Figure 4:
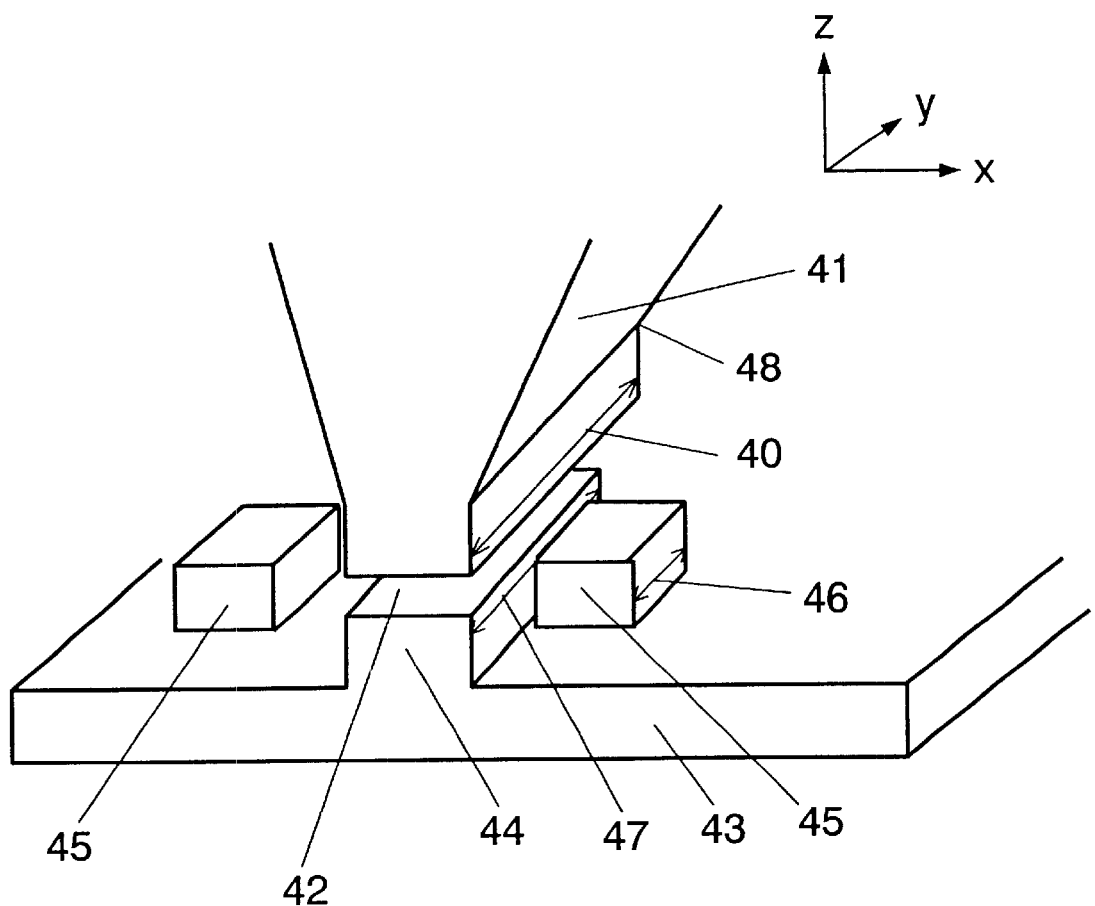
FIG. 4 is a perspective schematic view of a recording head unit of a thin film magnetic head in embodiment 2 of the invention.

FIG. 4 is a perspective schematic view of the recording head of a thin film magnetic head for explaining embodiment 2 of the invention.

In FIG. 4, a recording gap 42 is formed on a protrusion 44 provided in a common shield 43. An upper magnetic core 41 is formed at a position confronting the protrusion 44 by way of the recording gap 42. Further, a pair of shunt members 45, which are comprised of a soft magnetic material and have lateral depth 46,are provided.

A gap depth 40 is defined as either a distance 40 from the leading end of the upper magnetic core 41 to an apex 48 or a depth 47 in the depth direction of the protrusion 44 of the common shield 43, whichever the smaller. In this embodiment, the gap depth is the distance from the leading end of the upper magnetic core 41 to the apex 48.

When the shunts 45 are disposed closely to the recording gap 42, the magnetic flux flowing in the shunts 45 increases, and the recording magnetic field decreases, and a larger recording current is required. The inventor further continued studies and discovered that there is an optimum value in the ratio of the gap depth and the lateral depth 46 of the shunts 45.

Figure 5:
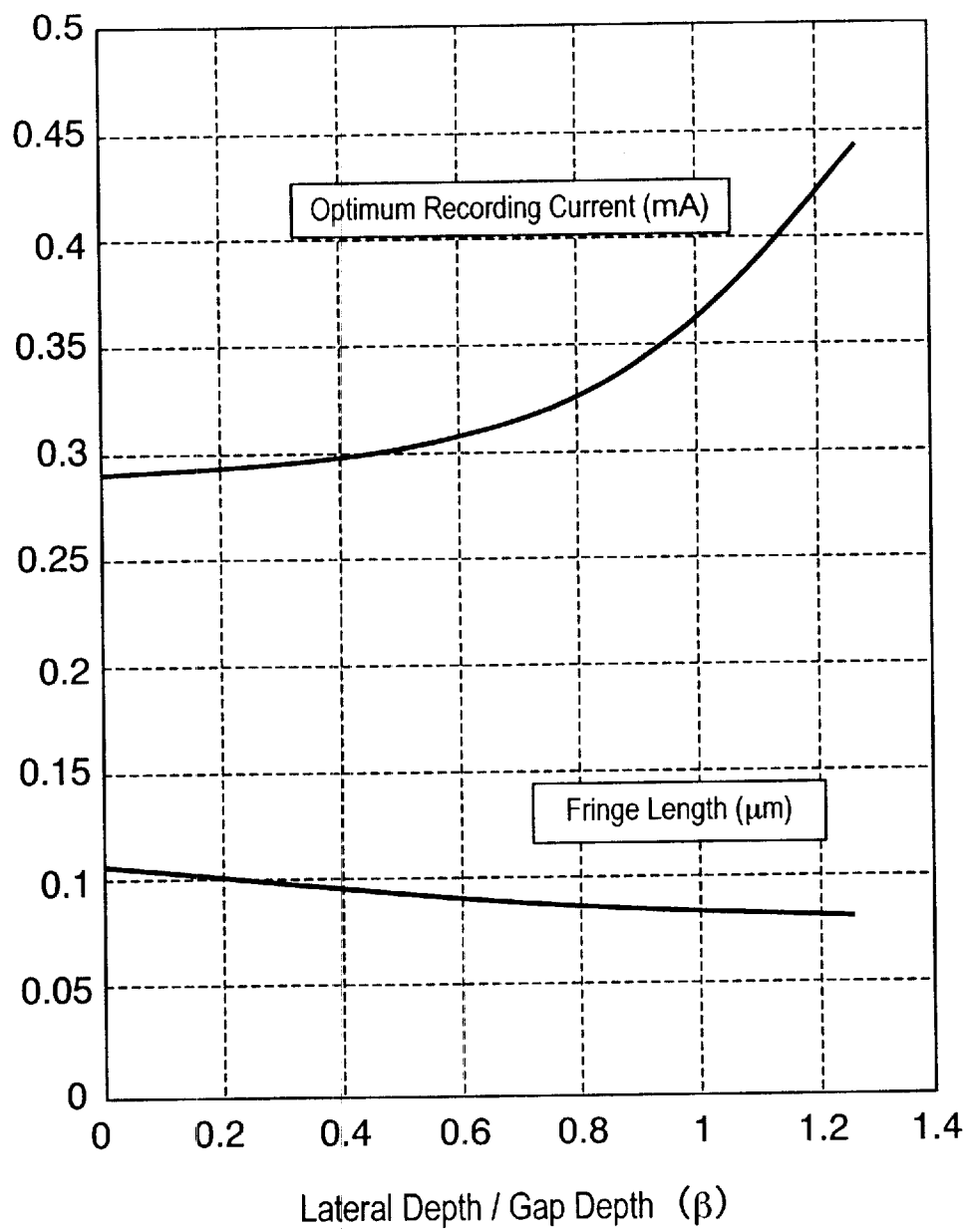
FIG. 5 is a diagram showing optimum recording current and recording fringe amount of the thin film magnetic head in embodiment 2 of the invention.

FIG. 5 shows the relation between the recording fringe amount and the optimum recording current by varying the ratio β of the gap depth 40 and the lateral depth 46 of the shunts 45 (β=lateral depth 46 of shunts 45/gap depth 40).

As shown in FIG. 5, when β is larger than 0.6, it is known that the recording current increases. When β is smaller than 0.2, the fringe decreasing effect is only 5% or less. That is, an appropriate range of β is $$0.2 < \beta < 0.6 \quad (3)$$

Thus, according to embodiment 2, by forming the shunts of which value of β is set in the range specified in formula 3, the recording fringe is suppressed, and the optimum recording current is not increased.

(Embodiment 3)

Figure 6:
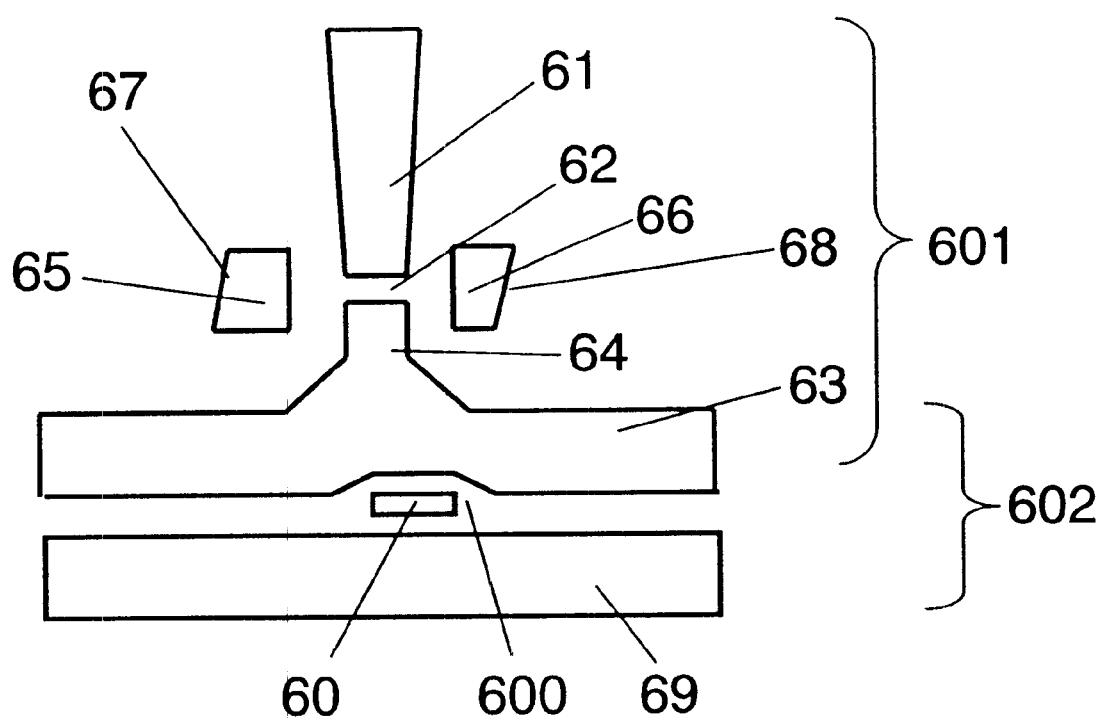
FIG. 6 is a front schematic view of a thin film magnetic head in embodiment 3 of the invention.

FIG. 6 is a front schematic view of a thin film magnetic head of embodiment 3 of the invention as seen from the ABS side.

In this embodiment, a recording head 601 is composed of an upper magnetic core 61, a recording gap 62, a common shield 63, and a pair of shunts 65, 66 same as in embodiment 1. Further, the recording gap 62 is formed above the protrusion 64 of the common shield 63 and the upper magnetic core 61 is formed so as to face protrusion 64 of the common shield 63. A reproducing head 602 is composed of the common shield 63, a lower shield 69, and a magnetic resistance element 60 magnetically insulated by a reproducing gap 600 from the shield 63 and 69, also same as in embodiment 1.

In this embodiment, the shunts 65 and 66 disposed near both side ends of the recording gap 62 are formed so that the surfaces 67 and 68 positioned at opposite sides of the surface confronting the recording gap 62 may be non-parallel in the gap length direction.

According to the embodiment, the same effects as in embodiment 1 are obtained, and further by setting the surfaces 67 and 68 non-parallel, the shape of the recording fringe is asymmetrical in the lateral direction. As a result, noise from the adjacent recording track detected by the reproducing head can be decreased.

Figure 7:
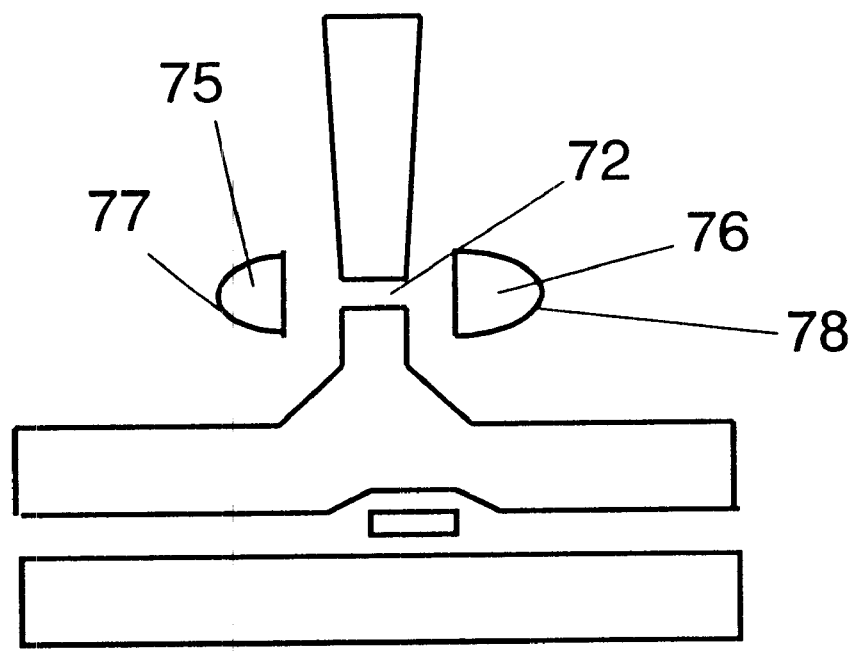
FIG. 7 is a front schematic view of a thin film magnetic head in other example of embodiment 3 of the invention.

FIG. 7 shows a front schematic view as seen from the ABS in other example. The opposite side surfaces 77 and 78 of the side confronting the recording gap 72 of the both shunts 75 and 76 are formed in arcs. In this case, too, the same effects as in the embodiment explained in FIG. 6 are obtained.

(Embodiment 4)

Figure 8:
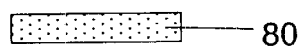
FIG. 8 is a manufacturing process outline explanatory diagram of a thin film magnetic head in embodiment 4 of the invention.
Figure 8:
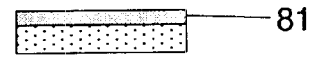
Figure 8:
Figure 8:
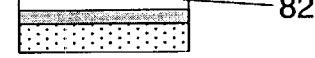
Figure 8:
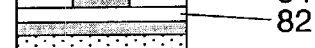
Figure 8:
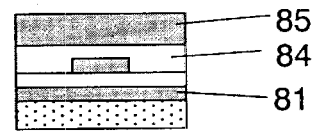
Figure 8:
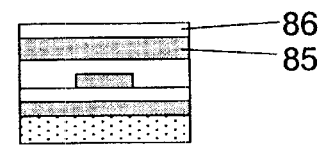
Figure 8:
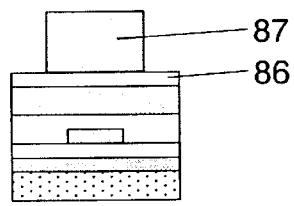
Figure 8:
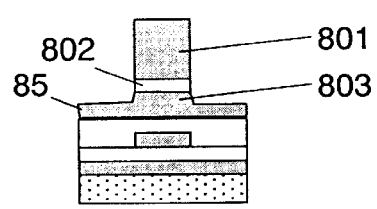
Figure 8:
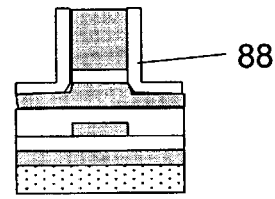
Figure 8:
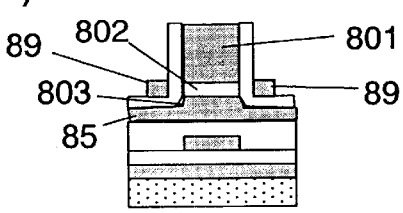
Figure 8:
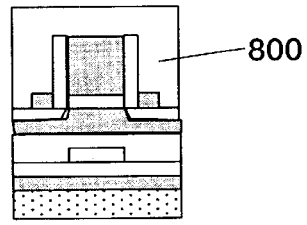

FIG. 8 is a diagram explaining the outline of manufacturing process of a manufacturing method of thin film magnetic head in embodiment 4 of the invention. Referring to FIG. 8, the manufacturing method of thin film magnetic head of the invention is explained in the sequence of manufacturing steps.

At a first step, a lower shield 81 of soft magnetic material shown in FIG. 8(b) is formed on a substrate 80 shown in FIG. 8(a). The substrate material is generally an AlTiC material covered with several microns of alumina, but nonmagnetic materials such as silicon, alumina, or sapphire, or magnetic materials such as Mn—Zn ferrite may be also used. The soft magnetic material of the lower shield 81 is Permalloy, Co amorphous magnetic film, Fe particulate magnetic film, etc. A proper thickness of soft magnetic material is about 1 to 5 μm.

At a second step, as shown in FIG. 8(c), a lower reproducing gap 82 is fabricated on the lower shield 81. The gap material is alumina, aluminum nitride, silicon, SiO2, etc. The thickness of the lower reproducing gap 82 is 10 to 1000 nm.

At a third step, as shown in FIG. 8(d), an MR element 83 and a lead (not shown) are formed on the lower reproducing gap 82. The MR element is SAL system MR film made of soft magnetic material, insulating material or soft magnetic material, or spin valve GMR film, TMR film, or the like. The thickness of the MR element is 10 nm to 200 nm. The lead is formed of conductive material made of Ta, Cu, Ti, etc.

At a fourth step, as shown in FIG. 8(e), an upper reproducing gap 84 is fabricated. The upper gap material is same as the material of the lower reproducing gap 82. The thickness of the upper reproducing gap 84 is 10 to 1000 nm.

At a fifth step, as shown in FIG. 8(f), a common shield 85 is formed on the upper reproducing gap 84. The material of the common shield 85 is same as the material of the lower shield 81. The thickness of the common shield 85 is 0.5 to 5 $\mu$m.

At a sixth step, as shown in FIG. 8(g), a recording gap layer 86 is laminated on the common shield 85. The material of the recording gap layer is alumina, aluminum nitride, silicon, SiO2, etc. The thickness of the recording gap layer 86 is 100 to 1000 nm.

At a seventh step, as shown in FIG. 8(h), an upper magnetic core layer 87 is formed on the recording gap layer 86. The material of the upper magnetic core layer is Permalloy, Co amorphous magnetic film, Fe particulate magnetic film, etc. The thickness of the upper magnetic core layer 87 is 1 to 5 $\mu$m.

At an eighth step, as shown in FIG. 8(i), the upper magnetic core layer 87, recording gap layer 86, and common shield 85 are trimmed by ion milling, reactive ion milling, FIB or other method. As a result of the eighth step, the left side surfaces and right side surfaces of the upper magnetic core 801, recording gap 802, and protrusion 803 of the common shield 85 are formed on a same plane.

At a ninth step, as shown in FIG. 8(j), an insulating member 88 is formed to cover the surface of the common shield 85 and the right and left side surfaces of the common shield 85, upper magnetic core 801 and recording gap 802 after trimming. The insulating member is alumina, aluminum nitride, silicon, SiO2, etc. The thickness of the insulating member 88 is 100 to 1000 nm. The thickness of the insulating member is preferred to be greater than the thickness of the recording gap 802.

At a tenth step, as shown in FIG. 8(k), a pair of shunt members 89 made of a soft magnetic material is formed. The soft magnetic material is Permalloy, Co or Fe derivative material. The thickness of the shunt material is 100 to 1000 nm. As shown in the diagram, the shunts 89 is formed as being magnetically insulated from the common shield 85 including the protrusion 803, recording gap 802, and upper magnetic core 801.

At an eleventh step, as shown in FIG. 8(l), an encapping portion 800 is made of alumina or the like.

After the eleventh step, the thin film magnetic head having the shunts is completely fabricated.

Thus, according to the embodiment, (1) the fine magnetically insulated shunts 89 are formed near the recording gap 802. (2) The right side surfaces and left side surfaces of the upper magnetic core 801, recording gap 802, and protrusion 803 of the common shield 85 are formed on a same plane, and the upper magnetic core 801 and the protrusion 803 of the common shield 85 are overlapped with each other. As a result, the width of the recording gap 802 is equal to the magnetic core width of the recording head, so that the recording fringe is smaller as compared with the case deviated between the two. (3) At the tenth step, the shunts 89 can be formed in a proper shape including the lateral depth and sectional shape by trimming, lift-off, etc., and therefore the thin film magnetic head of embodiment 2 or embodiment 3 can be fabricated easily. As a result, the thin film magnetic head suppressed in occurrence of recording fringe can be fabricated.

(Embodiment 5)

Figure 9:
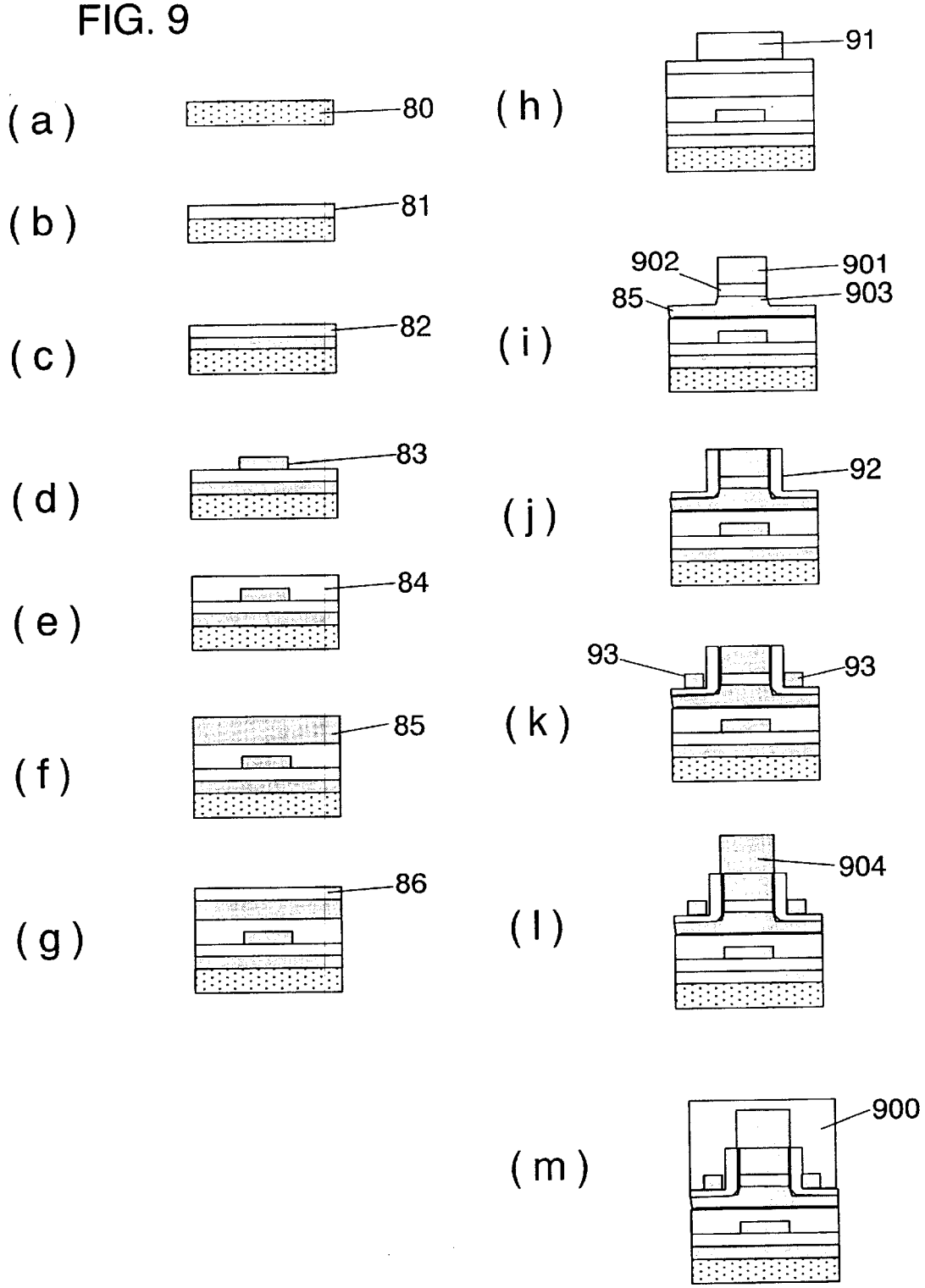
FIG. 9 is a manufacturing process outline explanatory diagram of a thin film magnetic head in embodiment 5 of the invention.

FIG. 9 is a diagram explaining the outline of manufacturing process of a manufacturing method of thin film magnetic head in embodiment 5 of the invention. Referring to FIG. 9, the manufacturing method is explained in the sequence of manufacturing steps.

After finishing from the first step to the sixth step in the same manner as in embodiment 4, at a seventh step, as shown in FIG. 9(h), an upper magnetic core layer 91 of a first layer is fabricated. The material of the upper magnetic core layer is Permalloy, Co amorphous magnetic film, Fe particulate magnetic film, etc. In particular, a material of high saturation magnetic flux density is preferred. A proper thickness of the magnetic core material of the first layer is 100 nm to 5 $\mu$m.

At an eighth step, as shown in FIG. 9(i), the upper magnetic core layer 91 of the first layer, recording gap layer 86, and common shield 85 are trimmed by ion milling, reactive ion milling, FIB or other method. As a result of this step, same as in embodiment 4, the right side surfaces and the left side surfaces of the upper magnetic core 901 of the first layer, recording gap 902, and protrusion 903 of the common shield 85 are formed on a same plane.

At a ninth step, as shown in FIG. 9(j), an insulating member 92 is formed to cover the surface of common shield layer 85 and the both side surfaces of the common shield layer 85, upper magnetic core 901 and recording gap 902. The insulating member is alumina, aluminum nitride, silicon, SiO2, etc. At this time, the upper magnetic core 901 of the first layer is processed by masking The thickness of the insulating member is 100 to 1000 nm.

At a tenth step, as shown in FIG. 9(k), a pair of shunt members 93 made of a soft magnetic material is formed. The soft magnetic material is Permalloy, Co or Fe derivative material. At this time, the upper magnetic core 901 of the firs layer is masked. The thickness of the shunt material is 100 to 1000 nm. The shunts 93 formed at this step are magnetically insulated from the common shield 85 including the protrusion 903 and upper magnetic core 901 of the first layer.

At an eleventh step, as shown in FIG. 9(l), an upper magnetic core 904 of a second layer is formed on the upper magnetic core 901 of the first layer. The material of the upper magnetic core of the second layer is Permalloy, Co or Fe derivative material, and it is preferred to use a material high in Bs and high in electric resistivity in order to decrease the eddy current. The thickness of the magnetic core of the second layer is 1 to 5 $\mu$m.

At a twelfth step, as shown in FIG. 9(m), an encapping portion 900 is made of alumina or the like. After this step, the thin film magnetic head having the shunts is completely fabricated.

Thus, according to the embodiment, same as in embodiment 4, it is possible to fabricate the shunts 93 of a fine shape near the recording gap 902. At the tenth step, the shunts 93 can be formed in a proper shape including the lateral depth and sectional shape by trimming, lift-off, etc., and therefore the thin film magnetic head of embodiment 2 or embodiment 3 can be fabricated. It is known well that the recording fringe is depending on frequency, and the recording fringe is larger as the frequency is lower.

To enhance the recording characteristic, the following materials can be used in the upper magnetic core 901 of the first layer, upper magnetic core 904 of the second layer, and shunts 93. The material of the upper magnetic core 901 is a material of high saturation magnetic flux density, and high in magnetic permeability at up to high frequency, and the material of the upper magnetic core 904 of the second layer is a material of high electric resistivity in order to decrease eddy current at high frequency, and high in magnetic permeability at up to high frequency. The material of the shunts 93 is a material high in magnetic permeability at low frequency, and low in magnetic permeability at high frequency, that is, about 100 because the recording fringe decreases frequency-dependently at high frequency. By using such materials, a strong recording magnetic field is obtained, eddy current is smaller, and high frequency characteristic is enhanced. The soft magnetic material for the shunts can be selected independently of the materials for the upper magnetic core and common shield. For example, it is very effective for fabricating the high frequency recording head to use Permalloy of iron 20% and nickel 80% for the lower shield 81 and common shield 85, iron-nitrogen magnetic film with saturation magnetic flux density of 1.8 T for the upper magnetic core 901 of the first layer, Permalloy of iron 50% and nickel 50% for the upper magnetic core 904 of he second layer, and sendust for the shunts 93.

(Embodiment 6)

Figure 10:
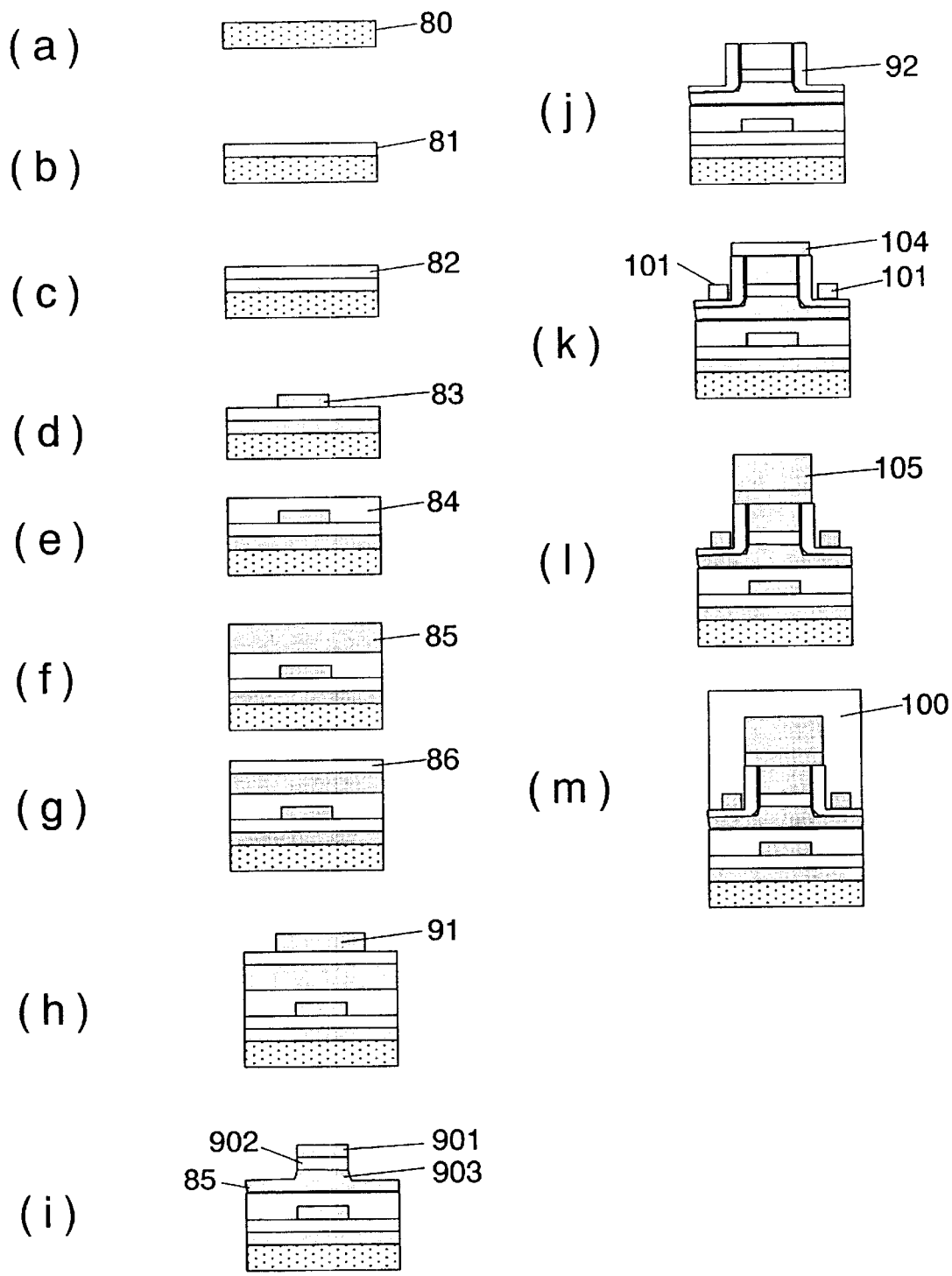
FIG. 10 is a manufacturing process outline explanatory diagram of a thin film magnetic head in embodiment 6 of the invention.

FIG. 10 is a diagram explaining the outline of manufacturing process of a manufacturing method of thin film magnetic head in embodiment 6 of the invention.

After finishing up to the ninth step in the same manner as in embodiment 5, at a tenth step, as shown in FIG. 10(k), a pair of shunts 101 made of a soft magnetic material and an upper magnetic core 104 of a second layer are formed. The soft magnetic material is Permalloy, Co or Fe derivative material. The thickness of the shunts 101 and upper magnetic core 104 of the second layer is 100 to 1000 nm each.

At an eleventh step, as shown in FIG. 10(l), an upper magnetic core 105 of a third layer is formed on the upper magnetic core 104 of the second layer. The material of the upper magnetic core 105 of the third layer is Permalloy, Co or Fe derivative material, and it is preferred to use a material high in Bs and high in electric resistivity in order to decrease the eddy current. The thickness of the upper magnetic core of the third layer is 1 to 5 $\mu$m. At a twelfth step, as shown in FIG. 10(m), an encapping portion 100 is formed of alumina or the like.

Thus, according to the embodiment, same as in embodiment 5, it is possible to fabricate the shunts of a fine shape near the recording gap, and the same effects as in embodiment 5 are obtained. Further, the upper magnetic cores of the second layer and third layer can be formed wider than the upper magnetic core of the first layer, and saturation of the upper magnetic core is prevented, increase of recording fringe is suppressed, and the optimum recording current can be decreased. For example, it is very effective for fabricating the head suited to high frequency recording to use Permalloy of iron 20% and nickel 80% for the lower shield 81 and common shield 85, iron-nitrogen magnetic film with saturation magnetic flux density of 1.8 T for the upper magnetic core 901 of the first layer, Permalloy of iron 50% and nickel 50% for the upper magnetic core 105 of the third layer, and sendust for the shunts 101 and upper magnetic core 104 of the second layer. Further, by the plating method, the process of forming a thick leading end of the recording unit can be done easily, and the yield is improved. Moreover, the recording efficiency is enhanced.

(Embodiment 7)

Figure 11:
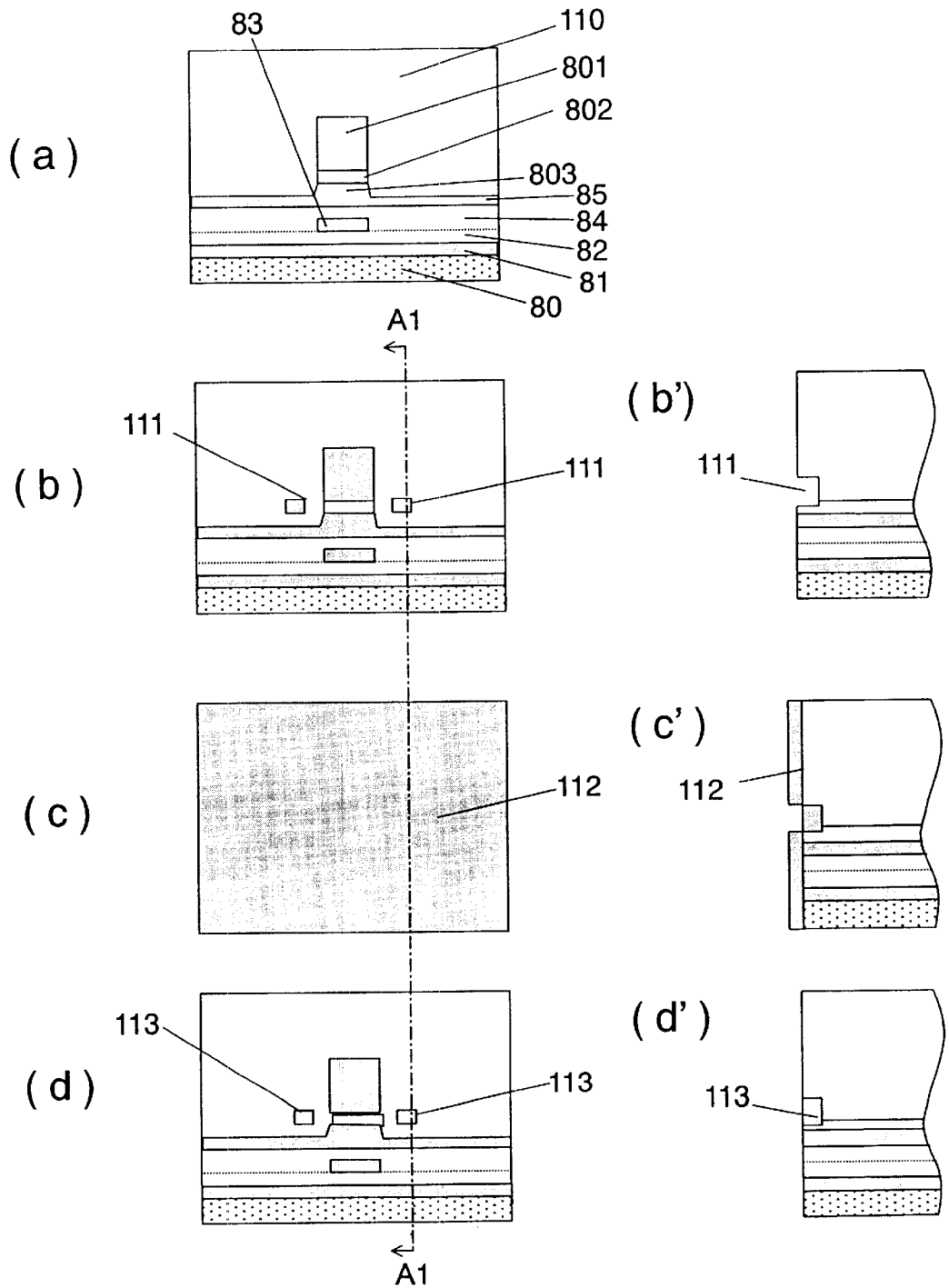
FIG. 11 is a manufacturing process outline explanatory diagram of a thin film magnetic head in embodiment 7 of the invention.

FIG. 11 is a diagram explaining the outline of manufacturing process of a manufacturing method of thin film magnetic head in embodiment 7 of the invention.

After finishing up to the eighth step in the same manner as in embodiment 4, at a ninth step, an encapping portion 110 is formed of an insulating material such as alumina.

At a tenth step, as shown in FIG. 11(a), the ABS side of the thin film magnetic head is smoothed to form a slider surface (not shown). At this stage, the ABS side shape may be also formed.

At an eleventh step, the ABS side is trimmed as shown in a front view in FIG. 11(b) and A1—A1 sectional view in (b'), and a pair of holes 111 is formed. The trimming method may be any one of the ion beam method, reactive ion beam method, focused ion beam method, and fast atomic beam method. The trimming depth is smaller than the recording gap depth, and is properly about 0.1 to 1 $\mu$m.

At a twelfth step, as shown in FIGS. 11(c) and (c'), to fill up the holes 111 formed in the ABS side, a soft magnetic layer 112 is formed on the entire ABS by sputtering or vapor deposition. The magnetic material for composing the soft magnetic layer 112 may have a magnetic permeability of 100 or more, and Permalloy, iron alloy or Co alloy may be used.

At a thirteenth step, as shown in FIGS. 11(d) and (d'), the ABS side is ground, and unnecessary parts in the soft magnetic material are removed, and a shunt 113 of a final shape is formed. Later, a protective layer may be also formed on the ABS side.

Thus, according to the embodiment, the shunts 113 can be formed in a free shape, and the magnetic characteristic of the shunts 113 can be set freely.

In the embodiment, as shown in FIG. 6 or FIG. 7 relating to embodiment 3, the shunts may be also fabricated in a shape having non-parallel or arc-shaped side surfaces in the gap length direction, at each side positioned at opposite side of the side confronting the recording gap of the shunt formed at both sides of the recording gap. Thus, the thin film magnetic head having the same effects as in embodiment 3 can be manufactured.

(Embodiment 8)

Figure 12:
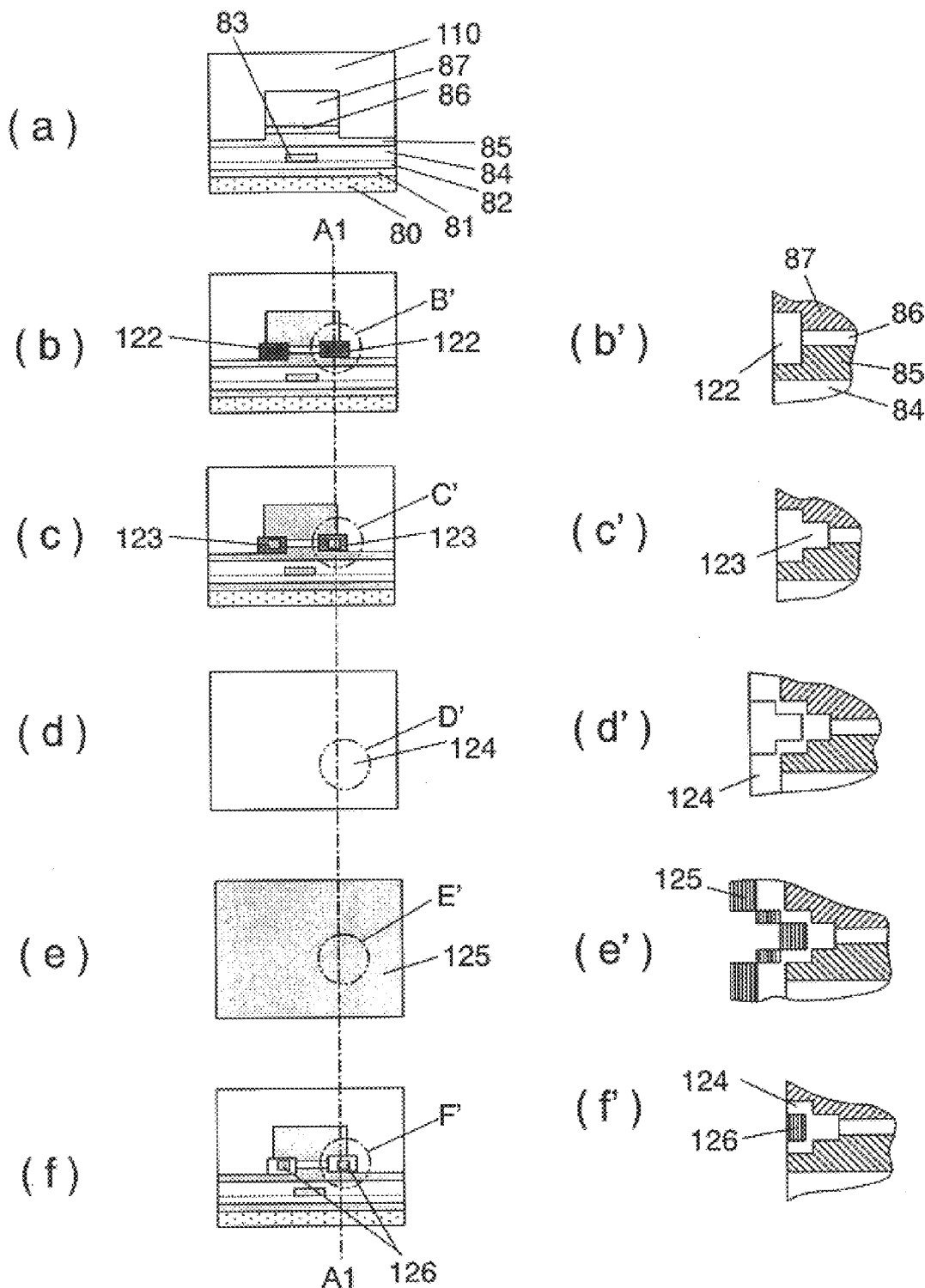
FIG. 12 is a manufacturing process outline explanatory diagram of a thin film magnetic head in embodiment 8 of the invention.

FIG. 12 is a diagram explaining the outline of manufacturing process of a manufacturing method of thin film magnetic head in embodiment 8 of the invention.

After finishing from the first step up to the seventh step in the same manner as in embodiment 4, at an eighth step, as shown in FIG. 12(a), an encapping portion 110 is formed of alumina or other material.

At a ninth step, the ABS side is smoothed. At this stage, the ABS side shape may be also formed. However, the gap depth and reproducing MR height must be left over larger than the specified height.

At a tenth step, the ABS side is trimmed as shown in a front view in FIG. 12(b) and A1—A1 sectional magnified view in double dot chain line in FIG. 12(b'), and a pair of first holes 122 are formed. The processing region of the pair of first holes 122 is trimmed so as to cover both the upper magnetic core 87 and common shield 85. By the pair of holes 122, recording track of specified width is formed.

The trimming method may be any one of the ion beam method, reactive ion beam method, focused ion beam method, and fast atomic beam method. The trimming depth is smaller than the recording gap depth, and is properly about 0.01 to 0.5 μm.

At an eleventh step, as shown in FIG. 12(c) and FIG. 12(c'), the inside of the first holes 122 formed in the ABS side is trimmed again, and second holes 123 are formed. The trimming process is the same method of trimming the first holes 122. The trimming depth is smaller than the recording gap depth, and is properly about 0.1 to 1.0 μm.

At a twelfth step, as shown in FIG. 12(d) and FIG. 12(d'), sputtering or evaporating a nonmagnetic material on the entire side of ABS including the first holes 122 and second holes 123 formed in the ABS side, an insulating layer 124 is formed. The thickness is preferred to be 1.5 times or more and 3 times or less of the recording gap length. The insulating material is alumina, aluminum nitride, silicon, SiO2, etc.

At a thirteenth step, as shown in FIG. 12(e) and FIG. 12(e'), from the ABS side, a soft magnetic material 125 is formed on the entire ABS side including the first holes 122 and second holes 123 forming the insulating layer 124 by sputtering or evaporating. The soft magnetic material 125 may have the magnetic permeability of 100 or more, and Permalloy, iron alloy, or Co alloy may be used.

At a fourteenth step, as shown in FIG. 12(f) and FIG. 12(f'), the slider surface is ground, and unnecessary portions of the soft magnetic material 125 and insulating layer 124 on the ABS side are moved, and shunts 126 are formed in the first holes 122 and the second holes 123 by the soft magnetic material 125 existing by way of the insulating layer 124. Later, the ABS side may be processed to obtain a final shape, and a protective layer may be formed on this processed surface.

Thus, according to the embodiment, it is intended to fabricate an excellent thin film magnetic head superior in precision of recording track width, decreased in recording fringe, and capable of recording at high density. Moreover, the upper width of the upper magnetic core is greater than the portion contacting with the recording gap, and the recording magnetic field is concentrated in the recording gap area, so that a strong recording magnetic field may be obtained.

Figure 13:
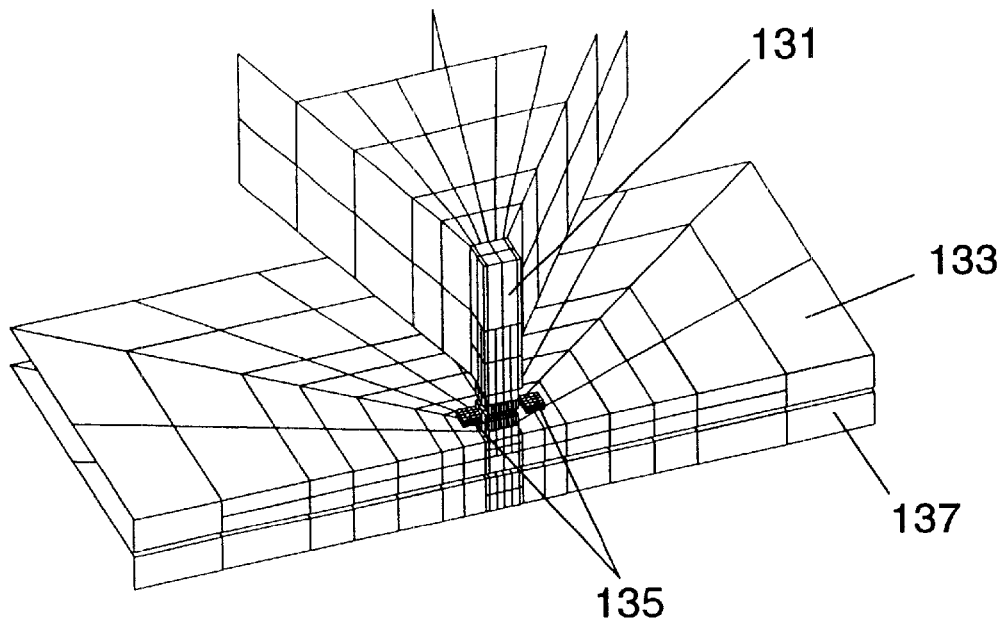
FIG. 13 is a top view of recording head unit of thin film magnetic head in embodiments 1 to 4 of the invention.

FIG. 13 shows a schematic top view of the recording head of the thin film magnetic head in embodiments 1 to 4 of the invention. The recording head is mainly composed of upper magnetic core 131, common shield 133, a pair of shunts 135 and lower shield 137.

Figure 14:
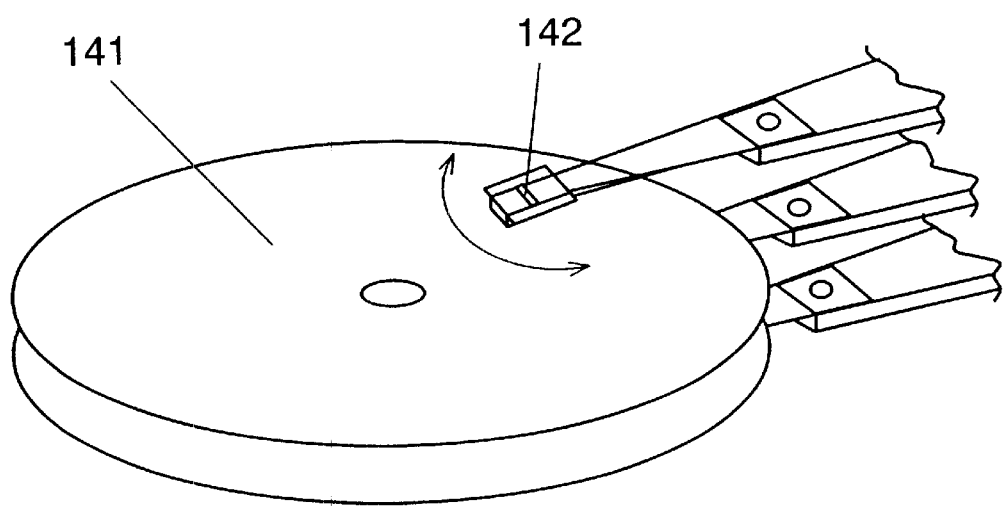
FIG. 14 is a diagram showing a magnetic recording apparatus of the invention.
Figure 15:
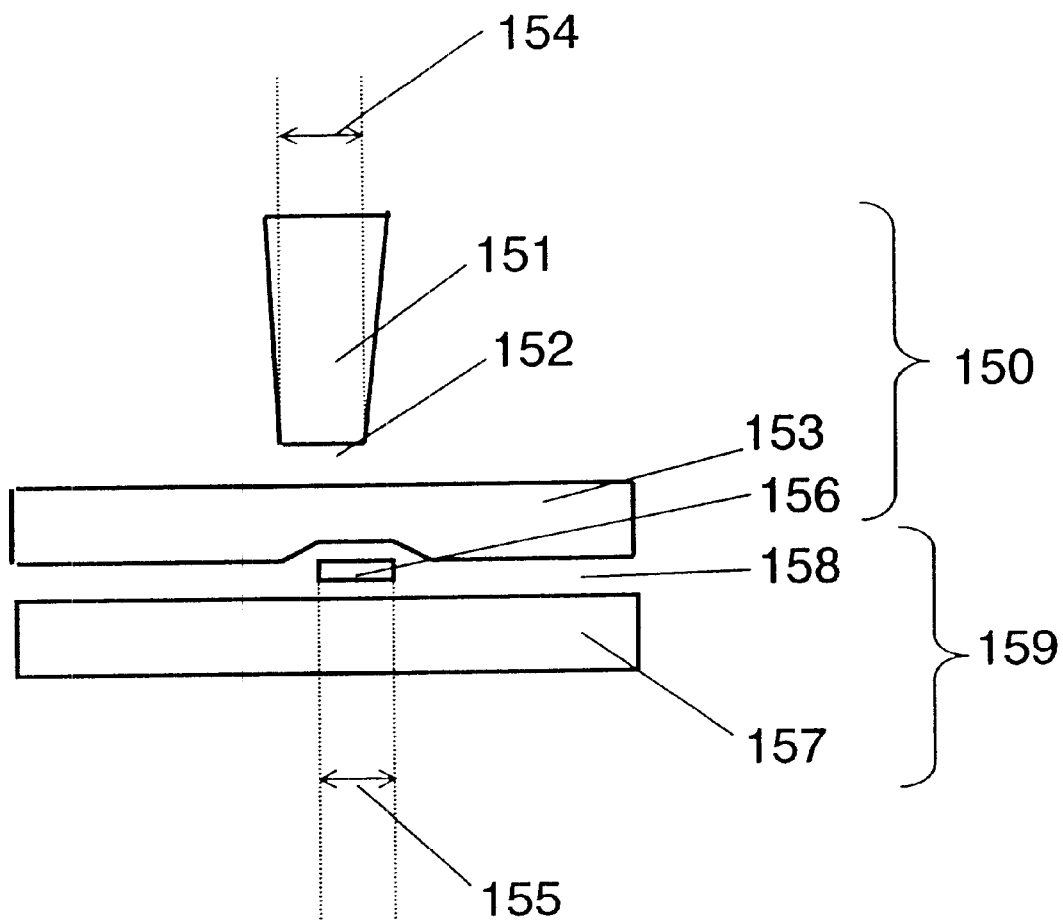
FIG. 15 is a front schematic view of a conventional thin film magnetic head.
Figure 16:
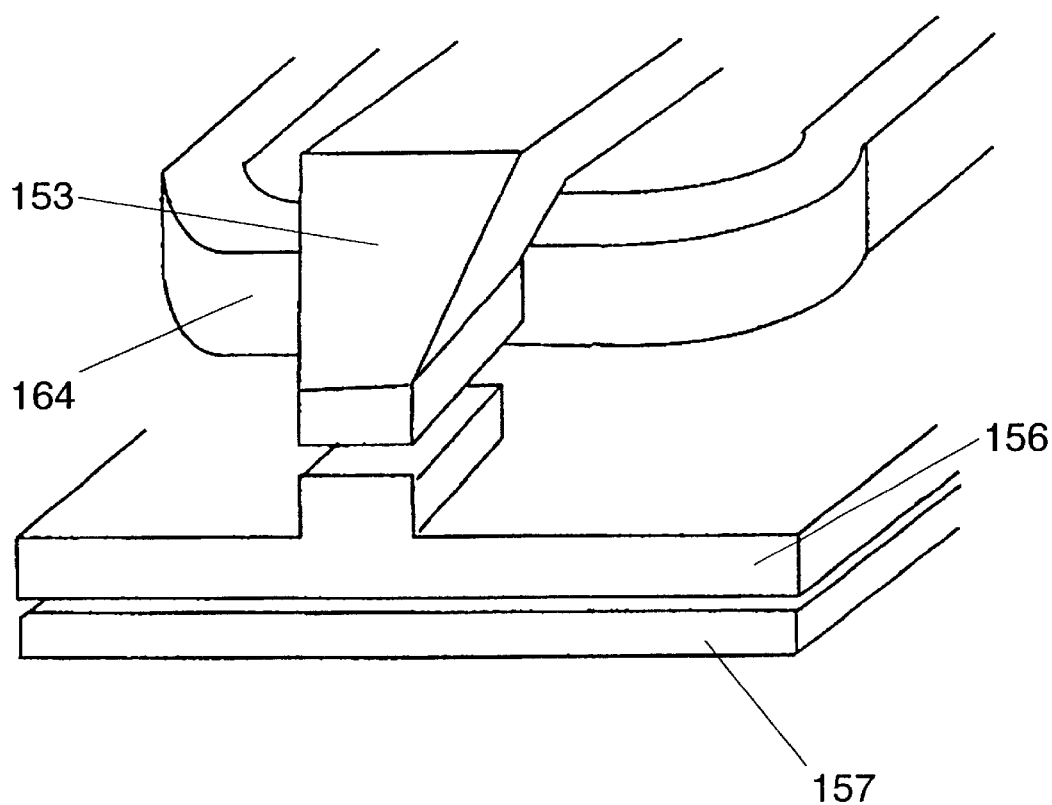
FIG. 16 is a top view of the conventional thin film magnetic head.
Figure 17:
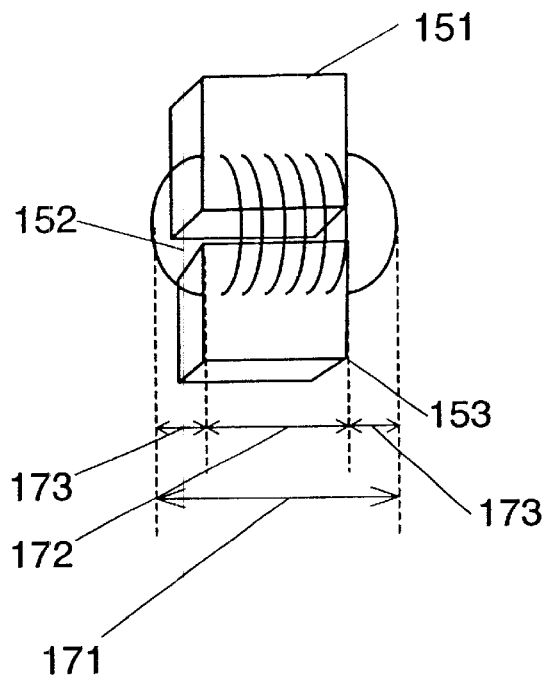
FIG. 17 is a diagram showing a leak magnetic flux of the conventional thin film magnetic head.

FIG. 14 shows a magnetic recording apparatus of the invention, which records and reproduces in a magnetic recording medium 141 by using a thin film magnetic head 142 of the invention. By using the thin film magnetic head of the invention, even if using the same reproducing head as in the prior art, the recording density in the track width direction can be enhanced remarkably. It also improves the output of the inside of the half-width of the off-track characteristic, and the 747-curve characteristic is also improved significantly. Therefore, with the same floating characteristic of the thin film magnetic head as in the prior art, the recording density is enhanced, and the reliability of the magnetic recording apparatus is improved.

Thus, according to the invention, by disposing a pair of shunts magnetically insulated from the upper magnetic core and common shield near the recording gap, the leak magnetic flux at the recording gap side end flows into the shunts. As a result, the recording fringe recorded in the magnetic recording medium is substantially decreased. Therefore, the recording track pitches can be narrowed, and it brings about an excellent effect of realizing a high recording density. In the invention, moreover, by forming the shunts and laminating the magnetic core in multiple layers, the recording fringe is decreased, the recording magnetic field is enhanced, and a thin film magnetic head of excellent high frequency characteristic is obtained. Hence, the recording density is enhanced.

What is claimed is:

1. A thin film magnetic head comprising:
   a common shield having both a shield function and a lower magnetic core function,
   a recording gap formed on said common shield, having a specified gap length and gap depth,
   an upper magnetic core disposed oppositely to said common shield through said recording gap, and
   a pair of shunt members made of a soft magnetic material formed at the side of said recording gap, the shunt members being magnetically insulated from said common shield and upper magnetic core.

2. The thin film magnetic head of claim 1, wherein said common shield has a protrusion formed in the portion confronting the upper magnetic core through said recording gap, and the right side surfaces and left side surfaces of said upper magnetic core and protrusions are formed on a same plane.

3. The thin film magnetic head of claim 2, wherein the ratio of the distance from the pair of shunts to the right side surface and left side surface of the protrusion to the gap length is 1.5 or more and 3 or less.

4. The thin film magnetic head of claim 3, wherein said pair of shunts formed in the vicinity of the right side surface and left side surface formed by the upper magnetic core and protrusion are non-parallel to the side forming the magnetic core and protrusion, at the side positioned at the opposite side of the side confronting the forming side of said magnetic core and protrusion.

5. The thin film magnetic head of claim 3, wherein said pair of shunts are mutually non-parallel at the side positioned opposite to the side confronting said magnetic core and protrusion.

6. The thin film magnetic head of claim 3, wherein each of said pair of shunts is arc shape at the side positioned opposite to the side confronting said magnetic core and protrusion.

7. The thin film magnetic head of claim 3, wherein the magnetic material for forming said pair of shunts has a lower magnetic permeability than the magnetic material forming the upper magnetic core and common shield.

8. The thin film magnetic head of claim 2, wherein said pair of shunts are formed in a specified depth from the ABS side, and the ratio of this depth to said gap depth is 0.2 or more and 0.6 or less.

9. The thin film magnetic head of claim 8, wherein said pair of shunts formed in the vicinity of the right side surface and left side surface formed by the upper magnetic core and protrusion are non-parallel to the side forming the magnetic core and protrusion, at the side positioned at the opposite side of the side confronting the forming side of said magnetic core and protrusion.

10. The thin film magnetic head of claim 8, wherein said pair of shunts are mutually non-parallel at the side positioned opposite to the side confronting said magnetic core and protrusion.

11. The thin film magnetic head of claim 8, wherein each of said pair of shunts is arc shape at the side positioned opposite to the side confronting said magnetic core and protrusion.

12. The thin film magnetic head of claim 8, wherein the magnetic material for forming said pair of shunts has a lower magnetic permeability than the magnetic material forming the upper magnetic core and common shield.

13. The thin film magnetic head of claim 2, wherein said pair of shunts formed in the vicinity of the right side surface and left side surface formed by the upper magnetic core and protrusion are nonparallel to the side forming the magnetic. core and protrusion, at the side positioned at the opposite side of the side confronting the forming side of said magnetic core and protrusion.

14. The thin film magnetic head of claim 2, wherein said pair of shunts are mutually non-parallel at the side positioned opposite to the side confronting said magnetic core and protrusion.

15. The thin film magnetic head of claim 2, wherein each of said pair of shunts is arc shape at the side positioned opposite to the side confronting said magnetic core and protrusion.

16. The thin film magnetic head of claim 2, wherein the magnetic material for forming said pair of shunts has a lower magnetic permeability than the magnetic material forming the upper magnetic core and common shield.

17. A manufacturing method of a thin film magnetic head comprising:
   a common shield having both shield function and lower magnetic core function,
   a recording gap formed on said common shield, having specified gap length and gap depth,
   an upper magnetic core disposed oppositely to said common shield through said recording gap, and
   a pair of shunt members made of a soft magnetic material formed at the side of said recording gap, being magnetically insulated from said common shield and upper magnetic core, said method comprising:
      a step of forming a nonmagnetic film as the recording gap on the common shield,
      a step of forming an upper magnetic core having a narrower width than the common shield on said nonmagnetic film,
      a step of trimming said nonmagnetic film and common shield in a specified depth, using said upper magnetic core as mask,
      a step of forming an insulating material on the trimmed surface, and
      a step of forming shunts made of soft magnetic material on said insulating material.

18. The manufacturing method of a thin film magnetic head of claim 17, further comprising:
   a step of forming at least one layer of soft magnetic material on said upper magnetic core.

19. A manufacturing method of a thin film magnetic head comprising:
   a common shield-having both shield function and lower magnetic core function,
   a recording gap formed on said common shield, having specified gap length and gap depth,
   an upper magnetic core disposed oppositely to said common shield through said recording gap, and
   a pair of shunt members made of a soft magnetic material formed at the side of said recording gap, being magnetically insulated from said common shield and upper magnetic core through a nonmagnetic layer,
   wherein said shunts are formed by trimming the nonmagnetic layer near the recording gap from the ABS side to form recesses, and filling the recesses with a soft magnetic material.

20. The manufacturing method of a thin film magnetic head of claim 19, further comprising:
   a step of forming a pair of first recesses by trimming from said ABS side, where the trimming area includes a part of both upper magnetic core and common shield,
   a step of forming second recesses in said pair of first recesses,
   a step of forming insulating layers of insulating material on the surface of said first and second recesses,
   a step of filling said the first and the second recesses forming said insulating layers with a soft magnetic material, and
   a step of grinding said ABS side including said second recesses filled with the soft magnetic material.

21. A magnetic recording and reproducing apparatus for recording and reproducing signals in a magnetic recording medium, wherein a magnetic head mounted on said magnetic recording and reproducing apparatus is a thin film magnetic head comprising:
   a common shield having both a shield function and a lower magnetic core function,
   a recording gap formed on said common shield, having a specified gap length and gap depth,
   an upper magnetic core disposed oppositely to said common shield through said recording gap, and
   a pair of shunt members made of a soft magnetic material formed at the side of said recording gap, the shunt members being magnetically insulated from said common shield and upper magnetic core through a nonmagnetic layer.

* * * * *